United States Patent [19]

Mayr

[11] Patent Number: 4,840,454
[45] Date of Patent: Jun. 20, 1989

[54] OPTICAL CABLE AND METHOD OF MANUFACTURING

[75] Inventor: Ernst Mayr, Starnberg, Fed. Rep. of Germany

[73] Assignee: Siemens Aktiengesellschat, Berlin and Munich, Fed. Rep. of Germany

[21] Appl. No.: 86,273

[22] Filed: Aug. 17, 1987

[30] Foreign Application Priority Data

Sep. 2, 1986 [DE] Fed. Rep. of Germany ....... 3629827

[51] Int. Cl.⁴ .............................................. G02B 6/44
[52] U.S. Cl. ................................................. 350/96.23
[58] Field of Search ..................................... 350/96.23

[56] References Cited

U.S. PATENT DOCUMENTS 4,705,571 11/1987 Lange et al. ........................ 252/78.3

FOREIGN PATENT DOCUMENTS 1104394 7/1981 Canada.

Primary Examiner—William L. Sikes
Assistant Examiner—Robert E. Wise

[57] ABSTRACT

A light waveguide bundle is saturated with an adhering first filling compound and is then inserted into a cladding of an optical cable. The first filling compound is selected so that it guarantees the cohesion of the light waveguides forming the bundle and still allows individual light waveguides to be separated from the light waveguide bundle. The remianing space within the outer cladding is filled with a second filling compound, whose viscosity is significantly lower than the viscosity of the first filling compound used for the saturation of each of the light waveguide bundles.

12 Claims, 1 Drawing Sheet

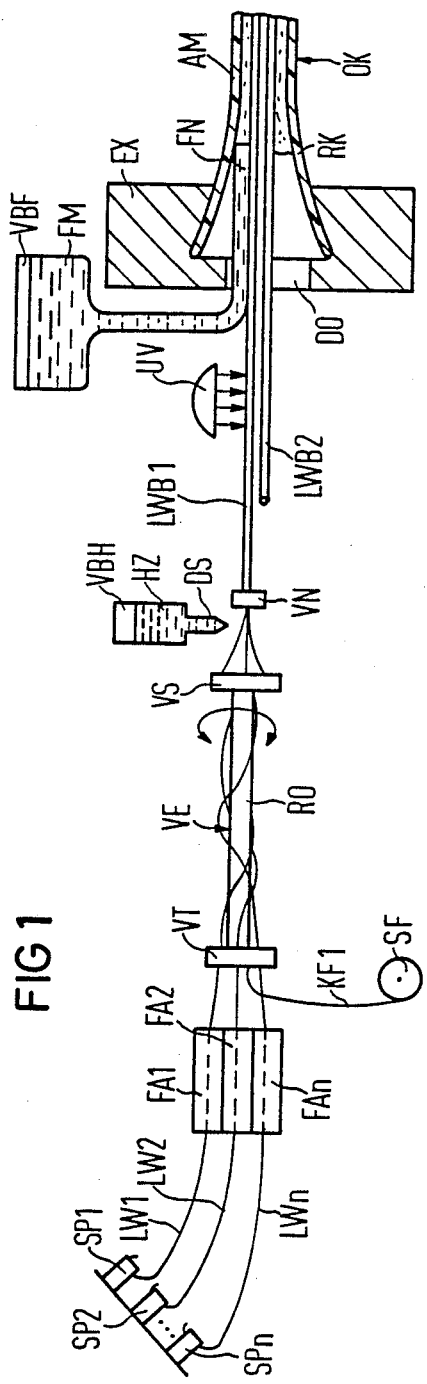
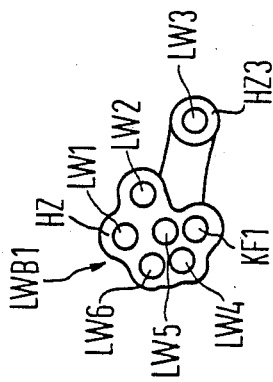
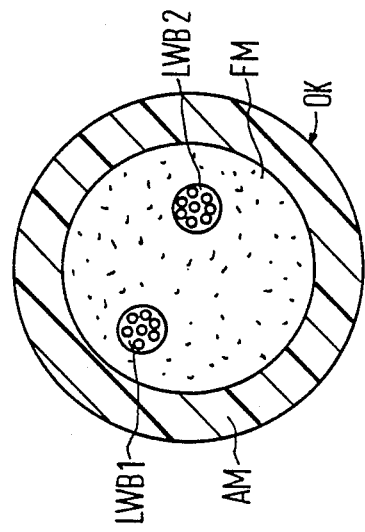

OPTICAL CABLE AND METHOD OF MANUFACTURING

BACKGROUND OF THE INVENTION

The present invention is directed to an optical cable comprising at least one light waveguide bundle containing a plurality of light waveguides with the light waveguide bundle being arranged within an outer cladding wherein a filling compound provides a longitudinal tightness for the cable core.

A cable of this type is disclosed in German AS No. 27 28 642, and includes an interior surrounded by cable cladding with the interior being filled with a substance lightly cross-linked. The longitudinal water-tight cable obtained in this way can contain a lightly cross-linking silicone resin, a polyester resin, a thermo-plastic polyurethane rubber or an expanded or swelled polysterol in oil as a filling compound. Since the overall cable core is provided with a single filling compound, this alone is what determines the overall behavior.

It is desirable in many instances to combine a plurality of individual light waveguide leads provided with a coating to form a bundle, wherein one such bundle or a plurality of these bundles are arranged within a common cable cladding. Such a bundle can be utilized as an independent unit in the manufacturing process and also offers more favorable possibilities within the framework of the splicing events because splicing can be respectively undertaken bundle-by-bundle. Thus, for example, a plurality of bundles can be provided which, although they comprise the same color combination with respect to their individual light waveguide leads, are nonetheless to be made additionally distinguishable from one bundle to another bundle. Thus, for example, one can manage with a low number of colors for the coloring of the waveguides. The prerequisite for a good discriminability and simple manipulation within the fiber bundle, however, is that the adherence within the bundle is still adequately guaranteed. For mechanical reasons, moreover, the bundle of leads must also comprise adequate elasticity in and of itself and must nonetheless offer the possibilities within the scope of the splicing operations of being able to detach every individual light waveguide lead from the union in the bundle.

SUMMARY OF THE INVENTION

The object of the present invention is to create a structure for the optical cable, which is easy and simple to manufacture, and which yields good protection of the light waveguides against mechanical stresses in its finished condition. In addition, the structure enables accessibility of the light waveguides to be simplified and the cohesion within the bundle remains guaranteed to an adequate degree.

These objects are obtained in an improvement in an optical cable having an outer cladding containing at least one bundle of a plurality of light waveguides and the cladding contains a filling compound providing longitudinal tightness of the cable core. The improvements are that each light waveguide bundle is saturated with an adhering, first filling compound whose consistency is selected so that it guarantees the cohesion of the light waveguides in the bundle and still allows a separation of the individual light waveguides from the light waveguide bundle and the remaining space within the outer cladding is filled with a second filling compound, whose viscosity is significantly lower than the viscosity of the first filling compound.

The first filling compound, which is actually used only for saturating the light waveguides, guarantees the cohesion of the light waveguide bundle (which is not exposed to any particularly high stresses as such). Nonetheless the first filling compound offers the possibility of again separating the individual light waveguides from the union in the light waveguide bundle in a simple way, which does not damage the light waveguides. This feature is indispensible during splicing of the individual light waveguides. As a consequence of the saturation with this first filling compound, undesired, air-filled gores or gaps between the waveguides of a bundle do not occur. Because the remaining space within the outer cladding is filled with a second, significantly softer filling compound, the possibility occurs that the light waveguide bundles can still execute yielding movements as a whole within the second filling compound. This feature is significant, for example, when bending, reeling or unreeling the cable. By matching the properties of two filling compounds which yield the longitudinal tightness to one another, a multitude of possibilities in view of the material selection and in view of the obtainable properties of the cable constructed in this way will occur. The light waveguide bundle, as such, offers favorable properties and possiblities for further processing because it is still adequately held together due to the adhering filling compound. On the other hand, compensation events of the individual light waveguides are nonetheless still possible to a slight degree within the bundle because their detachability from the overall union should still be guaranteed.

The invention is further directed to a method for manufacturing the cable of the above type, which is characterized in that the light waveguides are provided with a saturation comprising the first filling compound before they are combined or as they are being combined to form the light waveguide bundle and that the second filling compound is supplied before or during the extrusion of the outer cladding on the one or more bundles contained within the cable.

Other features and advantages of the present invention will be readily apparent from the following description of the drawings, preferred embodiments and claims.

BRIEF DESCRIPTION OF THE DRAWINGS

FIG. 1 is a schematic illustration of an apparatus for manufacturing an optical cable of the present invention;

FIG. 2 is an enlarged cross sectional view through an optical cable of the invention; and FIG. 3 is an enlarged cross sectional view through an individual light waveguide bundle in accordance with the present invention.

DESCRIPTION OF THE PREFERRED EMBODIMENTS

To provide the cable of the present invention, a plurality of coated light waveguides LW1, LW2-LWn are provided on reels SP1, SP2-SPn. These light waveguides are hauled-off these reels, preferably overhead, and traverse a separate coloring device FA1, FA2, FAn, so that a corresponding color-coded light waveguide is available at the output of the coloring device. The light waveguides are combined into a bundle, preferably by a stranding in a stranding means VE. In the present example, the stranding means includes a pipe storage RO, which operates in an alternating rotational sense and, thus, affects an SZ stranding of the light waveguide bundles formed by the light waveguides LW1–LWn. At its input, the pipe storage RO contains a stationary distributing disk VT and contains a stranding disk VS at its output end, which rotates with the pipe storage RO.

When a plurality of light waveguide bundles are provided within a cable, for example bundles LWB1, LWB2 in FIG. 2, then it is expedient to render the individual light waveguide bundles recognizable from one another. This can occur, for example, in that an identifying thread KF1 is stranded together with the light waveguides LW1–LWn and this identifier thread KF1 is taken from a supply reel SF. However, it is also possible to loosely apply this identifier thread to the light waveguide bundle after the stranding in the fashion of a retaining helix.

A reservoir VBH is provided at the output of the stranding means VE and this reservoir VBH contains a liquid resin HZ, which emerges through a nozzle DS and is directed towards the light waveguides as the first filling compound. The nozzle DS lies immediately ahead of a stranding nipple VN, for example, in the region in which the individual light waveguides have not yet been completely combined to form the bundle so that every individual light waveguide is moistened and surrounded by the practically liquid resin HZ. The following stranding nipple VN simultaneously serves as a stripping means, and assures that only slightly more than the outside contour of the light waveguide bundle is filled up by the resin HZ. It is also possible to combine the feed of the resin with the stranding nipple VN, for example, to apply a corresponding bore connected to a nozzle DS in the stranding nipple VN, and this bore emerging at the admission side and, thus moistening the entering light waveguides LW1–LWn with the resin on all sides.

It can be expedient to provide a corresponding supply of the first filling compound, for example, to effect a bead-like accumulation of the resin HZ in the region of the stranding nipple VN. The light waveguide bundles LWB1, thus moistened with the extremely liquid resin HZ on all sides is then supplied to a drying means, preferably in the form of a lamp UV, wherein the necessary cross-linking of the resin HZ will occur.

The resin HZ for the first compound should be selected so that, in terms of consistency, it effects a good moistening of the light waveguides LW1–LWn, yields a closed structure (optimally without air inclusions) within the bundle LWB1 and, thereby, still remains so soft after the cross-linking or, respectively, curing that the individual light waveguides LW1–LWn can be again separated from the union, as set forth in greater detail with reference to FIG. 3.

The light waveguide bundle LWB1 and the potential additional light waveguide bundles, schematically illustrated by the bundle LWB2, enter into a through opening DO of an extruder EX into which a filling needle FN also projects. The filling needle FN is connected to a reservoir VBF, in which a second filling compound FM is contained. In comparison to the cross-linked or cured resin HZ, this second filling compound FM exhibits a significantly lower viscosity and, for example, is softer up to and nearly liquid and fills the entire remaining inside of the finished optical cable OK. The filling needle FN extends up into the stretched cone RK of the extrusion supplied by extrusion EX, and this extrusion finally yields the outer cladding A of the optical cable OK after its diameter has been reduced by stretching, as illustrated.

Silicone resin is preferably employed for the resin HZ. It is thereby expedient that this is selected so that it can be cured by ultraviolet radiation. Instead of this silicone resin, however, other resins which will remain soft in their cross-linked condition can be utilized, for example, a polyurethane acrylates. The resin HZ should be transparent in order to keep the identifying colors of the light waveguides visible.

Known thixotropic filing compounds of polyglycol filling compounds, which are disclosed, for example, in allowed U.S. Ser. No. 881,950, which issued as U.S. Pat. No. 4,705,571 and is based on German Application No. P 32 24 166 and U.S. Ser. No. 881,695, now abandoned, which is based on German Application No. 35 24 181, preferably come into consideration as the second filling compounds FM. Cross-linking substances, which are cross-linking more lightly than the resin HZ, can also be utilized.

In cross section, the finished optical cable OK has the structure shown in FIG. 2. The individual light waveguide bundles LWB1 and LWB2 are held together by the stick, soft-elastic resin HZ to form the adequately solid, or stable, bundle structure. The resin HZ, as already mentioned, fully fills out the gores and gaps between the light waveguides of the bundle and it is, thus, to be considered as a first filling compound. The second filling compound FM closes the remaining, far larger space within the cable core and seals it in a fashion whereby the volume portion of the first filling compound or resin HZ is significantly lower than that of the second filling compound FM. The volume of the first filling compound HZ namely lies in the range of 1/10 to 1/100 of the volume of the second filling compound. Since the viscosity of the filling compound FM lies significantly lower than the viscosity of the resin HZ, the light waveguide bundles LWB1 and LWB2 can move somewhat within the extremely soft, second filling compound, for example, when the cable is bent. Thus, the bundles will evade mechanical stresses.

In FIG. 3, a magnified light waveguide bundle LWB1 is shown in cross section. The individual light waveguides LW1–LW6 are surrounded by resin HZ on all sides, and this resin HZ also surrounds the identifying thread KF1 at the same time. When the identifying thread KF1 does not traverse the moistening means, as illustrated in FIG. 1, this identifying thread can also lie outside of the resin envelope, for example, in the form of loosely applied retaining helix. In this case, the appertaining retaining helix spinner would be arranged in a position following the stranding nipple VM given the arrangement of the apparatus of FIG. 1 in a known manner or construction. The resin HZ, which surrounds the light waveguides LW1–LW6 in an adhering fashion, but which is still soft enough that the individual light waveguides can again be manually separated from one another without a tool, for example, by bending at their ends, ensures the adhesion of the light waveguides within the light waveguide bundle LWB1. For the splicing operation, by contrast, the light waveguide union can again be separated, as shown by the light waveguide LW3, which is separated from the union of the remaining light waveguides so that a resin film HZ3 detaches together with the light waveguide. The first filling compound formed by the resin HZ fills only a small part of the overall cross section of the light waveguide bundle LWB1. Namely, the first filling compound preferably fills only between 30% and 50% of the total cross section. The resin HZ should, thus, form a relatively thin coating on the individual light waveguides and should not spread out too greatly within the light waveguide bundle. In addition, the resin HZ should, likewise, not significantly enlarge the overall diameter of the light waveguide bundle towards the outside. In fact, it should not increase the diameter more than about 10%. The viscosity range (cured) at room temperature for the resin HZ is expediently selected from about 1,000–30,000 mPa s, whereas the viscosity range for the second filling compound lies between 100–5,000 mPa s.

Expediently, the viscosity of the second filling compound FM is selected at about 1/10–1/100 of the viscosity of the resin HZ. A significant, cheaper substance can be employed for the second filling compound FM than for the first filling compound, such as the resin HZ.

Although various minor modifications may be suggested by those versed in the art, it should be understood that I wish to embody within the scope of the patent granted hereon all such modifications as reasonably and properly come within the scope of my contribution to the art.

I claim:

1. In an optical cable having an outer cladding containing at least one light waveguide bundle containing a plurality of light waveguides and a filling compound providing longitudinal tightness of the bundle in the cable, the improvements comprising each light waveguide bundle being saturated with an adhering, first filling compound which has a viscosity and still holds together the light waveguides of each light waveguide bundle and wherein the remaining space within the outer cladding being filled with a second filling compound having a viscosity that is lower than the viscosity of the first filling compound.

2. In an optical cable according to claim 1, wherein the first filling compound is composed of a cross-linking resin.

3. In an optical cable according to claim 2, wherein said resin is a silicone resin.

4. In an optical cable according to claim 1, wherein the first filling compound forms only an enveloping coating on the individual light waveguides of each bundle.

5. In an optical cable according to claim 4, wherein the first filling compound makes up, at most, 30% to 50% of the overall cross section of each light waveguide bundle.

6. In an optical cable according to claim 1, wherein the volume share of the first filling compound is selected to be lower than the volume share of the second filling compound.

7. In an optical cable according to claim 6, wherein the first filling compound has a volume share which is approximately 1/10–1/100 of the volume share of the second filling compound in the cable.

8. In an optical cable according to claim 1, wherein the second filling compound is thixotropic and is composed of a thixotropic material selected from a group consisting of thixotropic oil and thixotropic polyglycol.

9. In an optical cable according to claim 1, wherein the second filling compound is composed of an essentially cross-linked material.

10. In an optical cable according to claim 1, wherein the viscosity of the second filling compound is selected between 1/10 and 1/100 of the viscosity of the first filling compound.

11. In an optical cable according to claim 1, wherein the first filling compound is selected from a group consisting of silicone resins and polyurethane acrylics.

12. In an optical cable according to claim 11, wherein the second filling compound is selected from a group consisting of thixotropic oils and thixotropic polyglycol.

* * * * *